United States Patent [19]
Moore et al.

[11] 3,740,868
[45] June 26, 1973

[54] PARISON OVEN

[75] Inventors: Lawrence A. Moore, King of Prussia; Leroy Mauger, Douglassville, both of Pa.

[73] Assignee: Beloit Corporation, Beloit, Wis.

[22] Filed: July 22, 1971

[21] Appl. No.: 165,136

[52] U.S. Cl. .................................. 34/105, 432/124
[51] Int. Cl. .............................................. F27b 9/24
[58] Field of Search ......................................... 263/8

[56] References Cited
UNITED STATES PATENTS
3,477,700  11/1969  Kinslow, Jr. ...................... 263/8 R
1,205,503  11/1916  Barnhart et al. .................... 263/8 R Primary Examiner—John J. Camby
Attorney—Larson, Taylor & Hinds

[57] ABSTRACT

An oven in which parisons to be heated are carried back and forth along a plurality of generally parallel paths while in an upright position. The endless chain carrying the parison holders is protected by a dust-cover. The parisons are turned about their axes periodically as they travel through the oven to assure that the parisons are heated uniformly.

11 Claims, 8 Drawing Figures

PATENTED JUN 26 1973 3,740,868

INVENTORS
LAWRENCE A. MOORE
LeROY MAUGER

BY Larson, Taylor and Hinds
ATTORNEYS

INVENTORS
LAWRENCE A. MOORE
LeROY MAUGER

BY Larson, Taylor and Hinds

ATTORNEYS

PARISON OVEN

BACKGROUND OF THE INVENTION

This invention relates to blow molding, and in particular it relates to the treatment of parisons for the blow molding process.

Numerous products such as foods, liquid soaps, etc. are now packaged and sold in non-breakable containers, referred to generally as "plastic bottles." These containers, which are commonly made from a polyolefin such as polyproylene are normally manufactured, inter alia, by extruding the material into an elongated endless hollow tube. Cut pieces of the tube, referred to as parisons, are used to form the said plastic bottles by blow molding techniques.

Since the parisons must be hot when they are formed into bottles, the original technique was to take the parisons, as soon as they were formed by the extruding apparatus, and while they were still hot, and to transfer them directly to the blow molding apparatus whereat they were molded into the desired shape. However, as explained in my U.S. Pat. application Ser. No. 3,003 filed Jan. 15, 1970, it has been found undesirable to necessarily link together the process of forming the parisons and the process of forming bottles from parisons. To the contrary, it is desirable to cool the extruded parisons to be formed into containers at a later time or perhaps even sold to others who may have facilities for forming bottles from parisons but who may not have facilities for initially forming the parisons. The separation of these two functions of course requires that the process of forming the bottles must start with cold parisons which must first be heated. Consequently, this technique has become known as the cold parison technique.

In the cold parison technique, the parisons are first heated in an oven as they travel through the oven mounted in an upright position on vertical pins. Subsequently, the heated parisons are stretched, or oriented, in order to improve their properties after which they are placed in the mold to be formed into containers.

Temperature uniformity is critical when heating the cold parisons. A parison which is not heated in a uniform manner will probably result in a rejected container. Such a parison will have cold spots which will stretch differently and be formed in the mold differently from the remainder of the parison. The result will be a container having a heavy spot or otherwise being out of balance.

Various techniques have been tried, and some with relative success to assure uniformity of heating the parisons. For example, in my previous application referred to above, baffle plates are arranged between the parallel tracks of travelling parisons in order to limit crossflow of heated air. The Marzillier U.S. Pat. No. 3,149,373 introduces the concept of rotating a parison about its axis as it travels through the oven.

However, none of these known arrangements solve all problems necessary to assure perfect uniformity and hence there is a continuing need for new and improved arrangements for further enhancing the uniformity of heating parisons within an oven. For example, the particular arrangement taught by Marzillier for rotating the parisons involves the use of abutments located below the parison holders and such means are not always feasible. Further, it has been found that dust particles within the oven tend to clog the chain carrying the parison holders, and hence interrupt its smooth movement through the oven.

SUMMARY OF THE INVENTION

Thus, it is a purpose of the present invention to provide a new and improved arrangement for further enhancing the uniformity of heating parisons within an oven prior to the blow molding process.

According to the present invention, this purpose is achieved by providing a number of construction features which interrelate to improve the heating uniformity in an oven of the type wherein parisons travel back and forth along a plurality of generally parallel paths. According to one feature of the invention, a dustcover is placed over the drive chain on which the parison holders are mounted throughout the travel of the drive chain along said generally parallel paths. Further, the dustcover is shaped to cover not only the links of the chain, but also those mechanical parts of the chain which hold the parison supporting elements. Only a small portion of the chain structure, namely the tops of thin parison holder rods which in turn hold the actual parison supporting elements, protrude above the dustcover. Consequently, through most of its travel throughout the oven, the chain is protected from the dust contained in the considerable quantity of air which flows through the oven.

According to another advantageous feature of the invention, with this chain structure, the said thin rods can be placed very close together, e.g. one-half inch, so that in practice, one can use every rod or every other rod, or every third, fourth, or fifth rod, etc., to thereby assemble the oven chain with different spacings between the parisons on different occasions without altering the design of the chain, sprockets and other related equipment.

According to another feature of the invention, a new and improved means is provided for causing rotation of the parisons about their axes as the parisons travel through the oven. In one arrangement, the chain sprockets at the end of each of the said paths are provided with a fixed friction plate which frictionally engages the parison support element on each parison holder rod as that parison travels about that sprocket. During engagement, the parison is turned about its axis by a predetermined amount.

In another arrangement, the parison supporting element is provided at its lower end with a star wheel, the teeth of which are arranged to engage fixed abutments located in a spaced apart relationship along the side of the dustcover.

Thus, it is an object of this invention to provide a new and improved parison oven in which heating uniformity is enhanced.

It is another object of this invention to provide a new and improved parison heating oven including means for enhancing uniformity of heating by protecting the travelling chain from foreign particles.

It is another object of this invention to provide a new and improved parison heating oven of the type in which the parisons travel back and forth along generally parallel paths which includes a convenient means for causing the parisons to rotate about their axes.

It is another object of this invention to provide a new and improved chain structure in which the parison spacing can be varied without altering the design of the chain, sprockets, or other related equipment.

Other objects and advantages of the invention will become apparent from the detailed description to follow together with the accompanying drawings.

BRIEF DESCRIPTION OF THE DRAWINGS

There follows a detailed description of preferred embodiments of the invention to be read together with the accompanying drawings which are provided for purposes of illustration.

DETAILED DESCRIPTION OF THE PREFERRED EMBODIMENTS

Referring now to the drawings, like numerals represent like elements throughout the several views.

Figure 1:
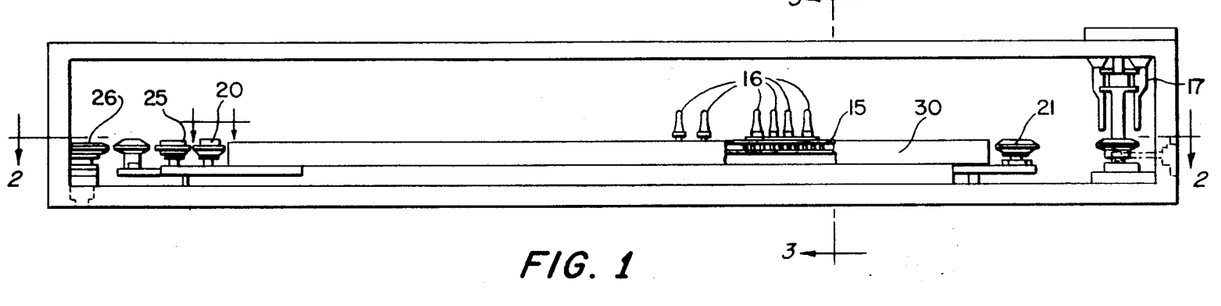
FIG. 1 is an elevational sectional view of a parison heating oven constructed in accordance with the features of the present invention, taken along line 1-1 of FIG. 2.
Figure 2:
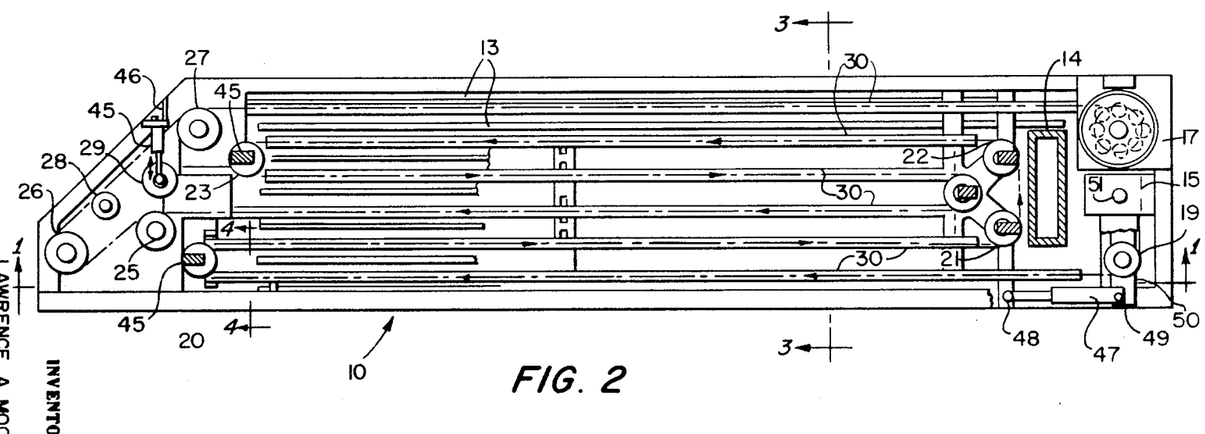
FIG. 2 is a horizontal sectional view of the parison heating oven taken along line 2—2 of FIG. 1.
Figures 2A, 3, 4:
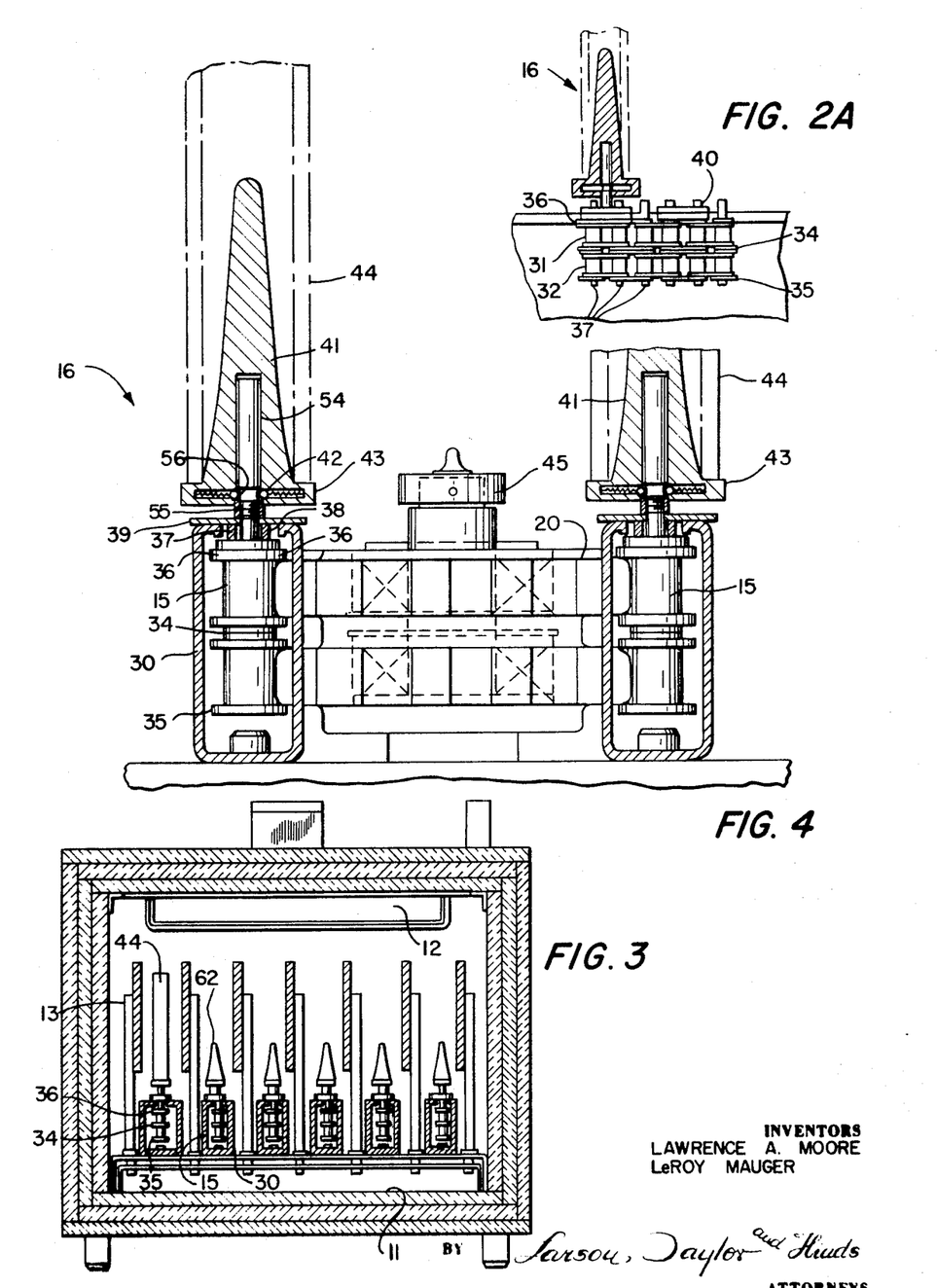
FIG. 2A is an enlarged view of a portion of FIG. 1.
FIG. 3 is a cross-sectional view of the parison heating oven taken along line 3—3 of FIGS. 1 and 2.
FIG. 4 is an enlarged cross-sectional view of a portion of the oven taken along line 4—4 of FIG. 2.

Referring now to the figures, and in particular to FIGS. 1 through 3, there is shown a parison heating oven 10 having a hot air inlet plenum 11 and an outlet air plenum 12. As the heated air flows through the interior of the oven, cross-flow is reduced by means of baffle plates 13. The exhaust air is delivered from the outlet plenum 12 through the vertical return air duct 14 to the heating unit located beneath the oven.

Within the oven there is provided an endless chain 15, the entire length of which is shown in dot-dash lines in FIG. 2. The chain is constructed with a plurality of parison holder rods spaced equidistantly along the chain. A portion of the chain with few of these are shown in FIG. 1. Although all parison holder rods are capable of carrying parison support elements, at any given time only every other, third, fourth, etc, rod will be used, depending on the desired spacing between parisons in any given operation. Those rods containing parison support elements, along with the parison support elements, will be referred to hereinafter for convenience simply as parison holders 16. The chain receives parisons at a parison feeder 17. This feeder is shown generally herein and the details are shown in my said previous application Ser. No. 3,003. As the parison holders 16 receive parisons at assembly 17, at which is located a chain sprocket 18, the chain travels through the oven along a plurality of generally parallel paths, the chain travelling in sequence in the direction of the arrows in FIG. 1 about the following pulleys: 19, 20, 21, 22, 23, 24, 25 and 26. In the vicinity of the sprocket 26, the parisons are removed. The chain then travels about sprockets 26, 28, 29, and sprocket 27 back to the parison feeder 17 to receive new parisons.

One feature of the present invention is a chain guard 30. Heretofore, as the heated air traveled through the oven, it tended to deposit particles on the chain, and hence interrupt the smooth movement of the chain through the oven. It is apparent that any force tending to interrupt the smoothness or the timing of the movement of the chain would have the effect of reducing uniformity of heating the parisons. To eliminate this, according to the present invention, a dustcover chain guard 30 is provided to cover each straight run of the chain between successive end pulleys. The chain guard 30 associated with the straight run between pulleys 19 and 20 is shown in FIG. 1, partially broken away to show a portion of the chain 15. Referring to FIGS. 3 and 4, the top portion of this dustcover is bent inwardly leaving only a slot through which a parison holder rod of the chain extends.

The chain and the parison holding structure are shown in detail in FIGS. 2A and 4. The chain is constructed with short horizontally extending links including upper links 36, intermediate links 34 and bottom links 35. These links hold vertical parison support structures including an elongated parison holder rod 37 and upper and lower spacers 31 and 32, these spacers encircling the rod 37. The upper and lower spacers space the intermediate links 34 from the upper and lower links 36 and 35, respectively. Also, as shown in FIG. 4, these spacers are engaged by the teeth of the sprockets for driving the chain 15. In a preferred embodiment, these rods are spaced with their centers one-half inch apart so that in practice, one can assemble the chain with any space between the parisons in one-half inch increments. Immediately above the portion 36 is a spacing element 38 and a cover plate 39, above which is mounted a snap ring 40 (see FIG. 2A). The upper end of each rod 37 is adapted to receive the parison support elements. In the illustrated embodiment, it is threaded at 55 to receive a guide pin 54. A cone-shaped parison support element 41 is removably mounted on the guide pin 54 by means of a spring biased holding element 42 which biases holding lugs into a circumferential groove 56 in the pin 54. The lower end of element 41 is provided with a circular flange 43 on which the parison 44 actually rests.

Figure 5:
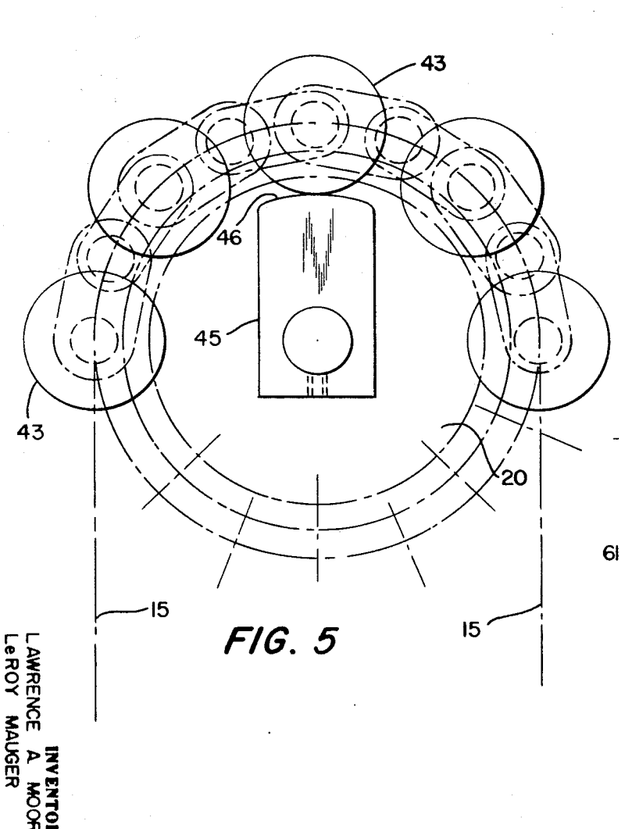
FIG. 5 is an enlarged horizontal sectional view of FIG. 4, and is taken along line 5—5 of FIG. 1.

One arrangement for causing the parisons to rotate about their axes is shown schematically in FIGS. 1 and 2 and in more detail in FIGS. 4 and 5. Specifically, each of the sprockets 19 through 24 may be provided with a fixed friction plate 45. The friction plate 45 associated with the sprocket 20 is shown in greater detail in FIGS. 4 and 5. The friction plate is arranged such that as each parison holder 16 encircles the sprocket 20 enroute to the next straight run of the path, the circular flange 43 is engaged by the fixed plate 45 such that the flange 43 and hence the element 41 and the parison 44 are rotated about the axis of parison 44. This arrangement has the advantage that the degree of rotation of the parisons in the vicinity of each sprocket can be regulated by simply varying the size i.e. the circumferential extent of the flange engaging portion of the friction plate 45.

Figure 6:
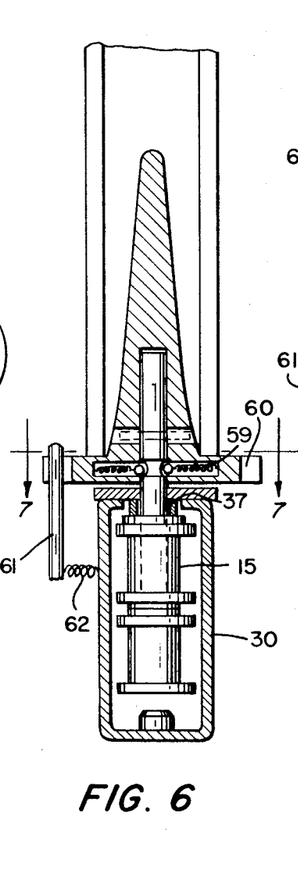
FIG. 6 is a cross-sectional view similar to a portion of FIG. 4 but showing a modification of the invention.
Figures 6, 7:
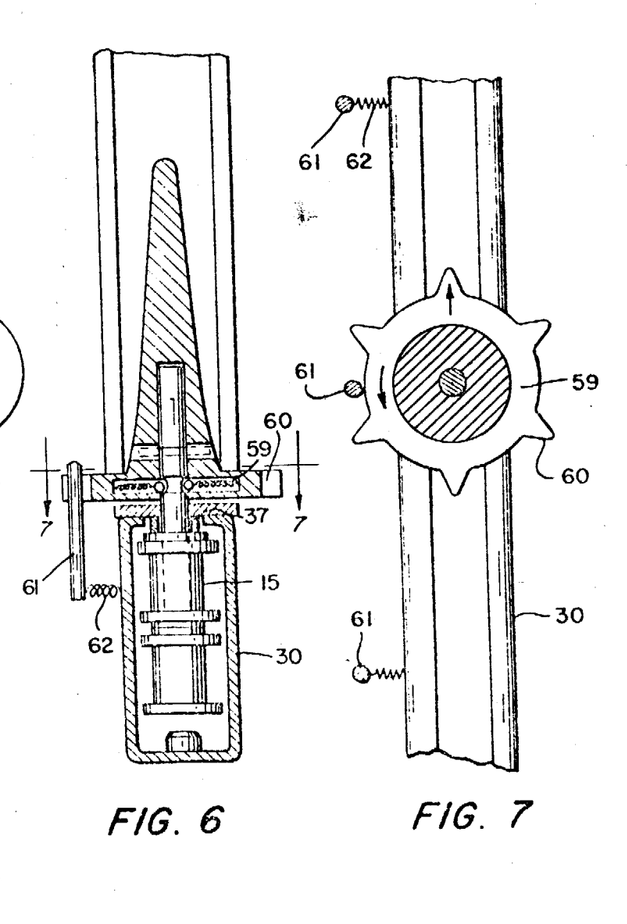
FIG. 7 is a horizontal sectional view taken along line 7—7 of FIG. 6.
Figure 7:
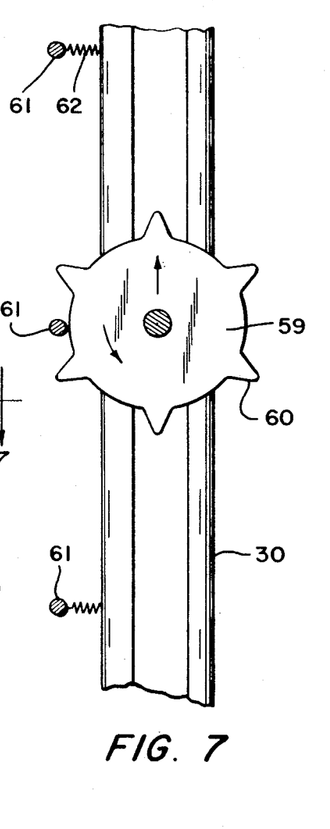

FIGS. 6 and 7 show another means for causing the parisons to rotate about their axes. At times, it may be desirable to have the parisons rotate about their axes as they travel along the straight runs of the oven. However, the previously known arrangements for causing rotation are not feasible when using the dustcover 30. Consequently, in accordance with a feature of the present invention, a modified parison holding element 59 is used which is generally star-shaped, having a plurality of teeth 60 extending outwardly therefrom. Any number of fixed abutments 61 may be mounted on the side of the dustcover 30 by suitable resilient means 62. Consequently, as the parison holding elements 59 travel along the straight runs of the path, they are turned each time that a tooth 60 engages a fixed abutment 61.

Suitable means are also provided for applying tension to the chain 15. At one end of the oven the sprocket 19 is mounted on a plate 50 which pivots about the axis of pin 51. A piston and cylinder unit 47 is mounted at one end 48 to a frame part and its other end 49 to plate 50. Thus, by expanding the unit 47, tension is applied to chain 15. At the other end of the oven, a piston and cylinder unit 45 is attached at one end to fixed frame part 46 and at its other end to the axis of pulley 29, such that expansion of the unit 45 moves the axis of pulley 29 downwardly (as viewed in FIG. 2) to apply tension to the chain 15.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. An oven for heating parisons comprising, a conveyor for carrying said parisons along a path within the oven, said conveyor including an elongated member extending along said path within the oven, parison holding means fixed on said member for holding parisons in an upright position thereon, said parison holding means including a circular member having a frictional outer peripheral surface located at a given height above the bottom of the oven, means for directing heated air through the oven to heat the parisons, and a turning means for periodically turning the parisons about their own axes as they travel through the oven, whereby the parisons are heated more uniformly, said turning means comprising an abutment member in the form of a frictional plate fixed along the side of said path at the said given height, wherein as each parison holding means moves along said path, its circular member is frictionally engaged by said frictional plate and turned about its axis to turn the parison about its axis.

2. The invention of claim 1, including wheel means spaced throughout the oven, and the elongated member being an endless member mounted on said wheel means for movement through back and forth paths within the oven, the friction plate being located on at least one of said wheel means.

3. The invention of claim 1, each said parison holding means comprising a pin fixed at its lower portion to the said elongaged endless member, and a parison holder removably mounted on the top of said pin.

4. The invention of claim 3, said pin being removably attached to a vertical rod part of the endless member.

5. The invention of claim 1, wherein the said conveyor is an endless chain having links connected together by vertical rod parts located with their centers spaced approximately one-half inch apart, each said rod part being constructed to removably hold means for supporting a parison.

6. An oven for heating parisons comprising: a conveyor for carrying said parisons along a path through an oven, said conveyor including an elongated member extending along said path through the oven, parison holding means fixed on the elongated member for holding parisons in an upright position, means for directing heated air through the oven to heat the parisons, a turning means for periodically turning the parisons about their own axes as they travel through the oven, whereby the parisons are heated more uniformly, each said parison holding means comprising a pin fixed at its lower portion to a rod part of the elongated member and having a parison holder mounted at its upper portion, and including a dust cover means for protecting a portion of the elongated member extending over a straight part of said path, the dust cover means comprising a pair of generally vertical plates arranged on each side of the elongated member, the tops of the plates being turned inwardly towards each other at a height at which the pins and the rod parts are connected, leaving a slot through which the said rod parts project as the parison holders travel along said path.

7. The invention of claim 6, said parison holding means including a star wheel mounted co-axially with the parisons at the upper portion of said rod, and said turning means comprising a plurality of fixed elements attached to the side of one of the plates of the dustcover means and spaced along the said paths, said elements being positioned to be engaged by the star wheel as it moves along the paths to turn the star wheel, and hence turn the parisons about their axes.

8. In an oven for heating parisons for a blow molding machine, said oven comprising an elongated conveying means for carrying parisons through the oven, said conveying means including a plurality of parison holding members rotatable to rotate the parisons about their axes, said parison holding members including a star wheel mounted co-axially with the parisons, projections on which star wheel extend outwardly to a given radial distance from its axis, and a means for rotating the said rotatable members about their axes comprising a plurality of fixed upright elements spaced along the side of said path and positioned within the said given radius to be engaged by the star wheel projections as the star wheel moves by the said elements to turn the star wheel, and hence turn the parisons about their axes, and including a spring means for resiliently connecting the fixed upright element to the oven.

9. The invention of claim 8, wherein each parison holding means comprises a vertically extending rod structure, said rod structure being partially disposed in the conveying means and the parison holding member being removably mounted on the rod.

10. The invention of claim 8, said conveying means being a conveyor chain and including a dust cover comprising plates located on each side of the conveyor chain and said fixed elements being resiliently connected to said dust cover and extending upwardly therefrom.

11. In an oven for heating parisons, said oven comprising a base portion in which is disposed a conveyor chain, a plurality of apertures in said conveyor chain, a parison holding structure comprising a plurality of elongated rods disposed vertically in said corresponding apertures in said conveyor chain, a plurality of parison holding members rotatable about their axes relative to said parison holding structure and being disposed above the conveyor chain, said rotatable member being in spaced relation with the conveyor chain, turning means for engaging the rotatable member to rotate it and hence rotate the parisons about their axes, said turning means comprising a plurality of stationary fixed elements extending upwardly, said parison holding member including a disc having a plurality of fingers extending outwardly therefrom, the fixed elements and the holding finger member being positioned such that as the holding members move along the conveyor chain, the said fingers engage the fixed elements to turn the parison holders and hence turn the parisons about their axes, and including a dust cover comprising plates located one on each side of the conveyor chain, the fixed elements connected to and extending upwardly from the said dust cover plates.

* * * * *

UNITED STATES PATENT OFFICE
CERTIFICATE OF CORRECTION

Patent No. 3,740,868      Dated June 26, 1973

Inventor(s)   Lawrence A. Moore et al.

It is certified that error appears in the above-identified patent and that said Letters Patent are hereby corrected as shown below:

Sheets 1 and 3 of the drawings should appear as shown on the attached sheets.

Signed and sealed this 26th day of November 1974.

(SEAL)
Attest:

McCOY M. GIBSON JR.
Attesting Officer

C. MARSHALL DANN
Commissioner of Patents

FIG. 1

FIG. 2

INVENTORS
LAWRENCE A. MOORE
LeROY MAUGER